(12) United States Patent
Zhao et al.

(10) Patent No.: US 10,798,585 B2
(45) Date of Patent: Oct. 6, 2020

(54) DYNAMIC FRACTIONAL FREQUENCY REUSE

(71) Applicant: Cisco Technology, Inc., San Jose, CA (US)

(72) Inventors: Qing Zhao, Fremont, CA (US); Dantong Liu, Mountain View, CA (US); Fred Jay Anderson, Lakeville, OH (US); Matthew Aaron Silverman, Shaker Heights, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 19 days.

(21) Appl. No.: 16/287,207

(22) Filed: Feb. 27, 2019

(65) Prior Publication Data

US 2020/0275282 A1    Aug. 27, 2020

(51) Int. Cl.
*H04W 16/10* (2009.01)
*H04W 72/04* (2009.01)

(52) U.S. Cl.
CPC ....... *H04W 16/10* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 10,154,415 B2 | 12/2018 | Madan et al. | |
| 2007/0177501 A1* | 8/2007 | Papasakellariou | H04W 24/00 370/229 |
| 2009/0061778 A1 | 3/2009 | Vrzic et al. | |
| 2009/0075596 A1 | 3/2009 | Gorokhov et al. | |
| 2009/0291691 A1* | 11/2009 | Jeong | H04W 72/048 455/450 |
| 2010/0085924 A1* | 4/2010 | Hamabe | H04W 16/30 370/329 |
| 2010/0197314 A1* | 8/2010 | Maaref | H04W 16/04 455/450 |
| 2010/0272018 A1* | 10/2010 | Furueda | H04W 36/385 370/328 |
| 2011/0070911 A1 | 3/2011 | Zhang et al. | |
| 2011/0141933 A1* | 6/2011 | Kim | H04W 52/146 370/252 |
| 2011/0194423 A1* | 8/2011 | Cho | H04W 52/04 370/252 |

(Continued)

*Primary Examiner* — German Viana Di Prisco
(74) *Attorney, Agent, or Firm* — Edell, Shapiro & Finnan, LLC (57) ABSTRACT

A distributed controller of local radio resources implements a hybrid FFR system. The distributed controller provides user channel information to a central controller of regional radio resources. The distributed controller also obtains an FFR plan from the central controller. The FFR plan designates for an access point associated with the distributed controller, a central frequency band, an edge frequency band, and a distribution of user devices connected to the access point. The distribution indicates whether each user device communicates with the access point via the central frequency band or via the edge frequency band. The distributed controller provisions the access pint to connect to the user devices according to the FFR plan, and adjusts the distribution of user devices locally based on a change in the user channel information.

20 Claims, 7 Drawing Sheets

(56) References Cited

U.S. PATENT DOCUMENTS

| | | | |
|---|---|---|---|
| 2011/0205929 A1* | 8/2011 | Quek | H04W 16/30 370/252 |
| 2012/0028664 A1 | 2/2012 | Zhang et al. | |
| 2012/0307750 A1* | 12/2012 | Hunukumbure | H04W 16/10 370/329 |
| 2013/0188548 A1* | 7/2013 | Lee | H04W 76/40 370/312 |
| 2013/0196676 A1* | 8/2013 | Koudouridis | H04W 72/04 455/452.1 |
| 2013/0308571 A1* | 11/2013 | Tao | H04W 16/02 370/329 |
| 2014/0295866 A1* | 10/2014 | Cho | H04L 5/003 455/452.1 |
| 2014/0302859 A1 | 10/2014 | Nama et al. | |
| 2015/0131537 A1* | 5/2015 | Chiang | H04L 5/0057 370/329 |
| 2017/0280467 A1* | 9/2017 | Zhu | H04W 72/0426 |

\* cited by examiner

```
┌─────────────────────────────────────────┐
│   PROVIDE USER CHANNEL INFORMATION TO   │─── 410
│         CENTRALIZED CONTROLLER          │
└─────────────────────────────────────────┘
                    │
                    ▼
┌─────────────────────────────────────────┐
│  OBTAIN FFR PLAN INCLUDING A CENTRAL    │─── 420
│  FREQUENCY BAND, AN EDGE FREQUENCY BAND,│
│  AND A DISTRIBUTION OF USER DEVICES     │
│  CONNECTING VIA THE CENTRAL/EDGE        │
│  FREQUENCY BAND                         │
└─────────────────────────────────────────┘
                    │
                    ▼
┌─────────────────────────────────────────┐
│  PROVISION ACCESS POINT(S) TO CONNECT   │─── 430
│  TO THE USER DEVICES ACCORDING TO THE   │
│  FFR PLAN                               │
└─────────────────────────────────────────┘
                    │
                    ▼
┌─────────────────────────────────────────┐
│  ADJUST DISTRIBUTION LOCALLY BASED ON   │─── 440
│  CHANGE IN USER CHANNEL INFORMATION     │
└─────────────────────────────────────────┘
```

DYNAMIC FRACTIONAL FREQUENCY REUSE

TECHNICAL FIELD

The present disclosure relates to fractional frequency reuse in a wireless network.

BACKGROUND

Fractional Frequency Reuse (FFR) is an interference management technique well-suited to Orthogonal Frequency-Division Multiple Access (OFDMA) cellular networks in which the cells are partitioned into spatial regions with different frequency reuse factors (FRFs). Typically, the user devices in the cell center adopt FRF=1, in which all of the user devices in the cell centers of neighboring cells use the same frequency band to increase the spectrum utilization. The user devices in the cell edge adopt a higher FRF (e.g., FRF=3 in a hexagonal cellular network model) to ensure that user devices on the cell edge of neighboring cells use different frequencies, reducing inter-cell interference.

DESCRIPTION OF EXAMPLE EMBODIMENTS

Overview

A method is provided for a distributed controller of local radio resources to implement a hybrid FFR system. The method comprises providing user channel information to a central controller of regional radio resources. The method also includes obtaining an FFR plan from the central controller. The FFR plan designates for an access point associated with the distributed controller, a central frequency band, an edge frequency band, and a distribution of a plurality of user devices connected to the access point. The distribution indicates whether each user device communicates with the access point via the central frequency band or via the edge frequency band. The method further comprises provisioning the access pint to connect to the plurality of user devices according to the FFR plan, and adjusting the distribution of user devices locally based on a change in the user channel information.

EXAMPLE EMBODIMENTS

To implement an FFR system, at least two parameters may need to be configured. One parameter is the frequency partition between the cell center and the cell edge, i.e., how much of the total frequency bandwidth is allocated to the cell center (e.g., operating with FRF=1) and how much of the frequency bandwidth is allocated to the cell edges (e.g., operating with FRF=3). Another parameter is the cell center/edge user device partition, i.e., which user devices are assigned to the cell center and which user devices are assigned to the cell edge. As the user distribution and channels vary over time, updating these two parameters to achieve the best network performance may be constrained by the computational complexity in various dynamic network scenarios.

As neighboring cells use the same frequency partition, the determination of the frequency partition may need to be globally optimized over all of the neighboring cells, even as the cell center/edge partition of user devices is a local decision within one cell that does not affect other cells. The techniques presented herein provide a centralized semi-dynamic frequency partition and distributed dynamic cell center/edge partitions of user devices. This hybrid mechanism splits the processing load, allowing a central controller to process global decisions (e.g., the frequency partition of all of the cells), while the distributed controllers process local decisions (e.g., the cell center/edge partition of user devices within each cell). The hybrid mechanism offers easier and lower cost implementation in comparison to a purely centralized implementation.

The centralized semi-dynamic frequency partition includes measurement input from user devices (e.g., channel state information (CSI) reports) to a base station to obtain real-time user channel information (e.g., a signal-to-interference ratio (SIR) estimation). The base station reports the SIR estimation for the local conditions to a central radio resource management (RRM) controller. Based on the collected estimation over a predetermined period of time, the central RRM controller may create a map of the SIR distribution over the entire network, i.e., among different neighboring cells. With this information, the central RRM controller may calculate the globally optimized frequency partition (e.g., what frequency band each cell will use as the center frequency band or the edge frequency band) and a threshold (e.g., SIR threshold) to differentiate the user devices into the cell center or the cell edge. The central RRM controller may globally optimize the frequency partition and threshold to maximize the network utility (e.g., enable the most users to experience the highest data rate). The frequency partition and cell center/edge threshold may be updated semi-dynamically based on user channel information (e.g., SIR estimations) collected over a predetermined period of time (e.g., several tens of minutes).

As the user device distribution and channels vary over time, the semi-dynamic frequency partition and cell center/edge threshold may result in inferior network performance between the updates from the central RRM controller. To mitigate the effect of changing user device distributions and channels, the distributed RRM controllers (e.g., the base station in each cell) may adjust the distribution of user devices (e.g., by changing the cell center/edge threshold) in a real time manner. The cell center and cell edge partition of user devices may be executed by the distributed RRM controller in each base station locally with no inter-base-station signaling.

In one example, base stations may have already accepted some user devices as cell center devices or cell edge devices, and assigned certain radio resources to the user devices. In order to avoid unnecessarily switching the radio resources assigned to the existing user devices, the base station may make the cell center/edge partition based on the remaining radio resources in the network, without changing the cell center/edge partition of the existing user devices. This avoids frequent changes in the cell center/edge status of a particular user device, which may impede the performance of other radio functionality, such as uplink power control.

In another example, the distribution of user devices in the cell center or cell edge may be determined by an SIR threshold. The central controller may determine an FFR plan through a greedy user and frequency partition approach, where in each snapshot of the user device distribution, the central controller identifies an optimal frequency partition and SIR threshold to partition the cell center and cell edge for each cell. However, the computational complexity of performing an exhaustive search over all possible values of frequency partitions and SIR threshold renders this "near-optimal" solution impractical for real-time updates. Given A different possible states of the frequency partition, B different possible values of SIR threshold, and M cells in total, the computational complexity of one user distribution is $O(A(B)^M)$, which escalates rapidly with increasing numbers of cells. While the "near-optimal" approach is not practical for the central controller to achieve, it may serve as a benchmark for the hybrid approaches that offload some of the computational complexity from the central controller to the distributed controllers, as described herein.

Figure 1:
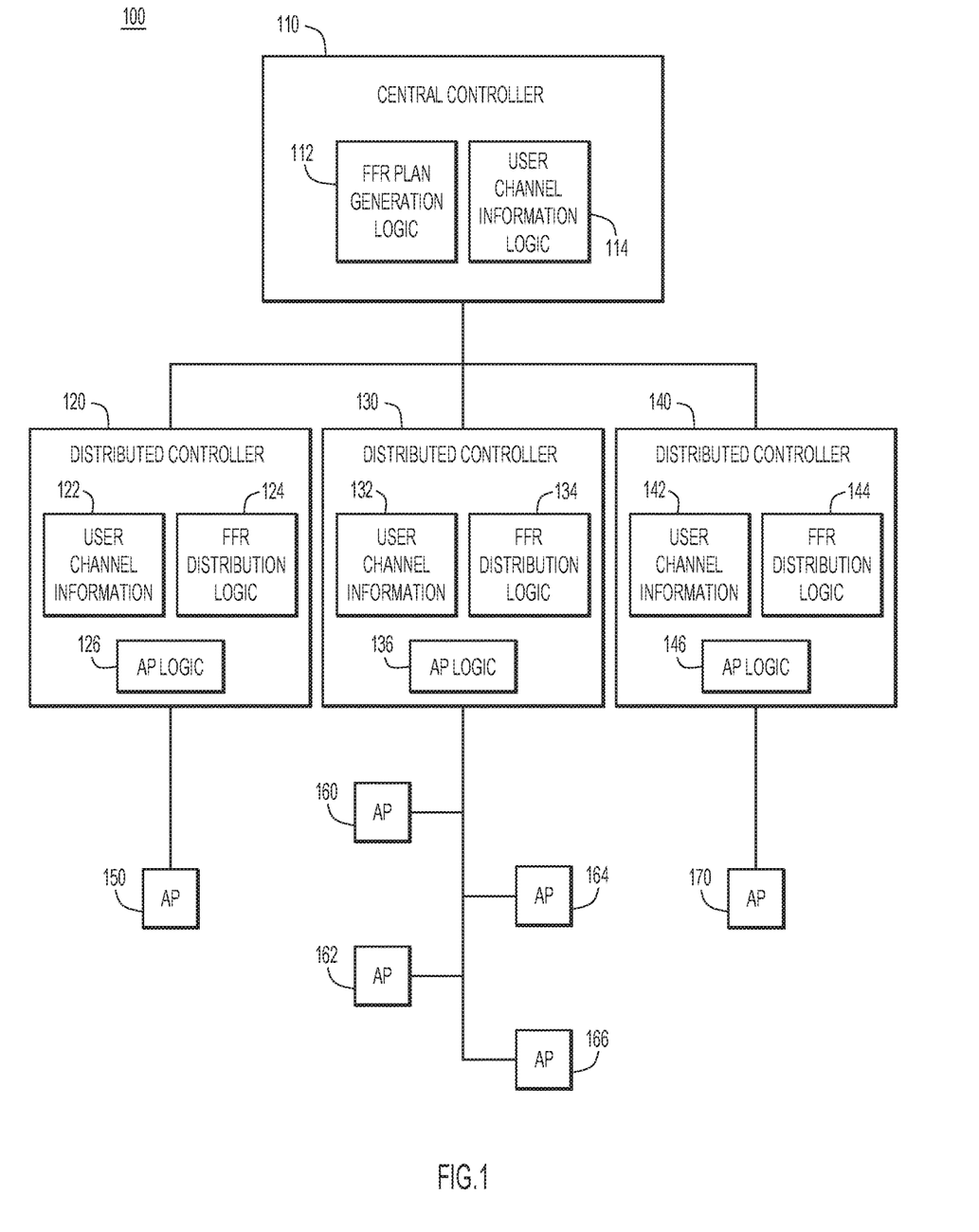
FIG. 1 is a simplified block diagram of a radio resource management system implementing fractional frequency reuse according to an example embodiment.

Referring now to FIG. 1, a simplified block diagram illustrates a radio resource management system 100 that allocates radio resources according to the hybrid FFR techniques described herein. The system 100 includes a central controller 110 with FFR plan generation logic 112 and User Channel Information logic 114. The FFR plan generation logic 112 includes instructions for determining a global FFR plan including a frequency partition for a plurality of cells and a threshold for each cell to determine which user devices connect to the cell center frequency band or to the cell edge frequency band. The User Channel Information logic 114 includes instructions to receive user channel information describing the connection to a plurality of user devices.

The central controller 110 is connected to a distributed controller 120 that controls the radio resources for a local area. The distributed controller 120 includes user channel information 122 describing the connection of user devices to access points in the local area. The distributed controller 120 also includes FFR distribution logic 124 with instructions for which frequency bands to use in the local area, as well as a threshold for determining which frequency band (e.g., the central frequency band or edge frequency band) each user device is assigned. The distributed controller 120 also includes access point (AP) logic 126 with instructions on provisioning any access points in the local area according to the FFR plan obtained from the central controller 110. The AP logic 126 may also include instructions for obtaining user channel information 122 from the access points in the local area.

The central controller 110 is also connected to distributed controller 130 and distributed controller 140 that control radio resources for two additional local areas. The distributed controllers 130 and 140 include user channel information 132 and 142, FFR distribution logic 134 and 144, and AP logic 136 and 146, respectively, which perform analogous functions to the user channel information 122, FFR distribution logic 124 and AP logic 126 of the distributed controller 120.

Each of the distributed controllers 120, 130, and 140 is connected to one or more access points, which connect to a plurality of user devices according to the hybrid FFR system described herein. Distributed controller 120 is connected to a single access point 150. Distributed controller 130 is connected to four access points 160, 162, 164, and 166. Distributed controller 140 is connected to a single access point 170. Each of the access points 150, 160, 162, 164, 166, and 170 define a cell in the global cellular network organized by the central controller 110.

Figure 2A:
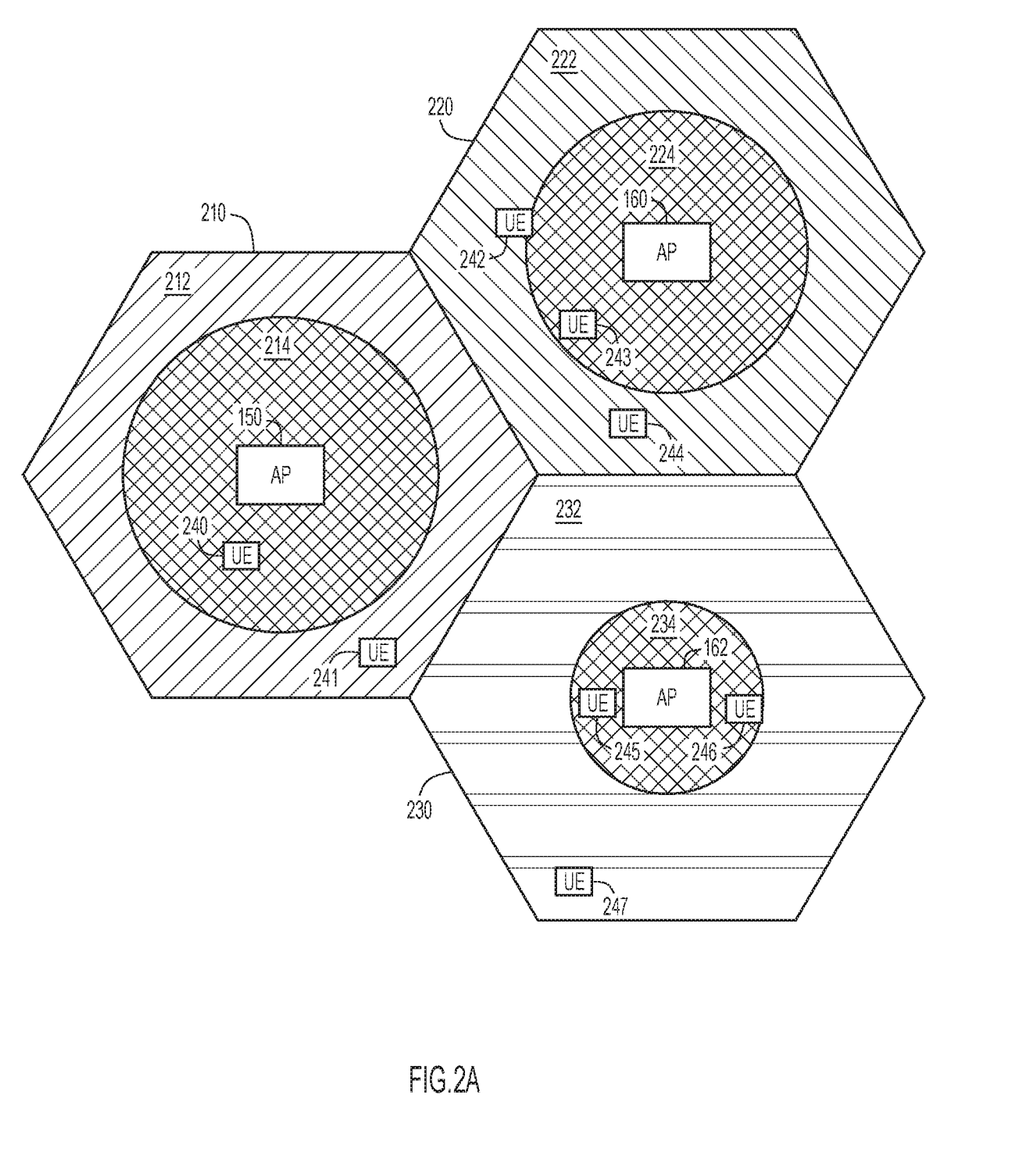
FIG. 2A illustrates an example embodiment of a cellular network assigning user devices based a fractional frequency reuse system, according to an example embodiment.

Referring now to FIG. 2A, an example of a FFR plan for three adjacent cells in a cellular network is shown. Access point 150 serves a cell 210, which is divided between cell edge 212 and cell center 214. Access point 160 serves a cell 220, which is divided between cell edge 222 and cell center 224. Access point 162 serves a cell 230, which is divided between cell edge 232 and cell center 234. User Equipment (UE) devices are spread throughout the cells, and are directed to connect to the access point of the respective cell either through the cell center frequency band or the cell edge frequency band.

UEs 240 and 241 are connected to the access point 150 in cell 210. The access point 150 (or the distributed controller 120 connected to the access point 150, as shown in FIG. 1) has set a threshold (e.g., visually depicted as the radius of cell center 214) that places UE 240 in the cell center 214 and UE 241 in the cell edge 212. UEs 242, 243, and 244 are connected to the access point 160 in cell 220. The controller behind access point 160 has set a threshold that places UE 243 in the cell center 224 and UEs 242 and 244 in the cell edge 222. UEs 245, 246, and 247 are connected to the access point 162 in cell 230. The controller behind access point 162 has set a threshold that places UE 245 and UE 246 in the cell center 234 and UE 247 in the cell edge 232.

Figure 2B:
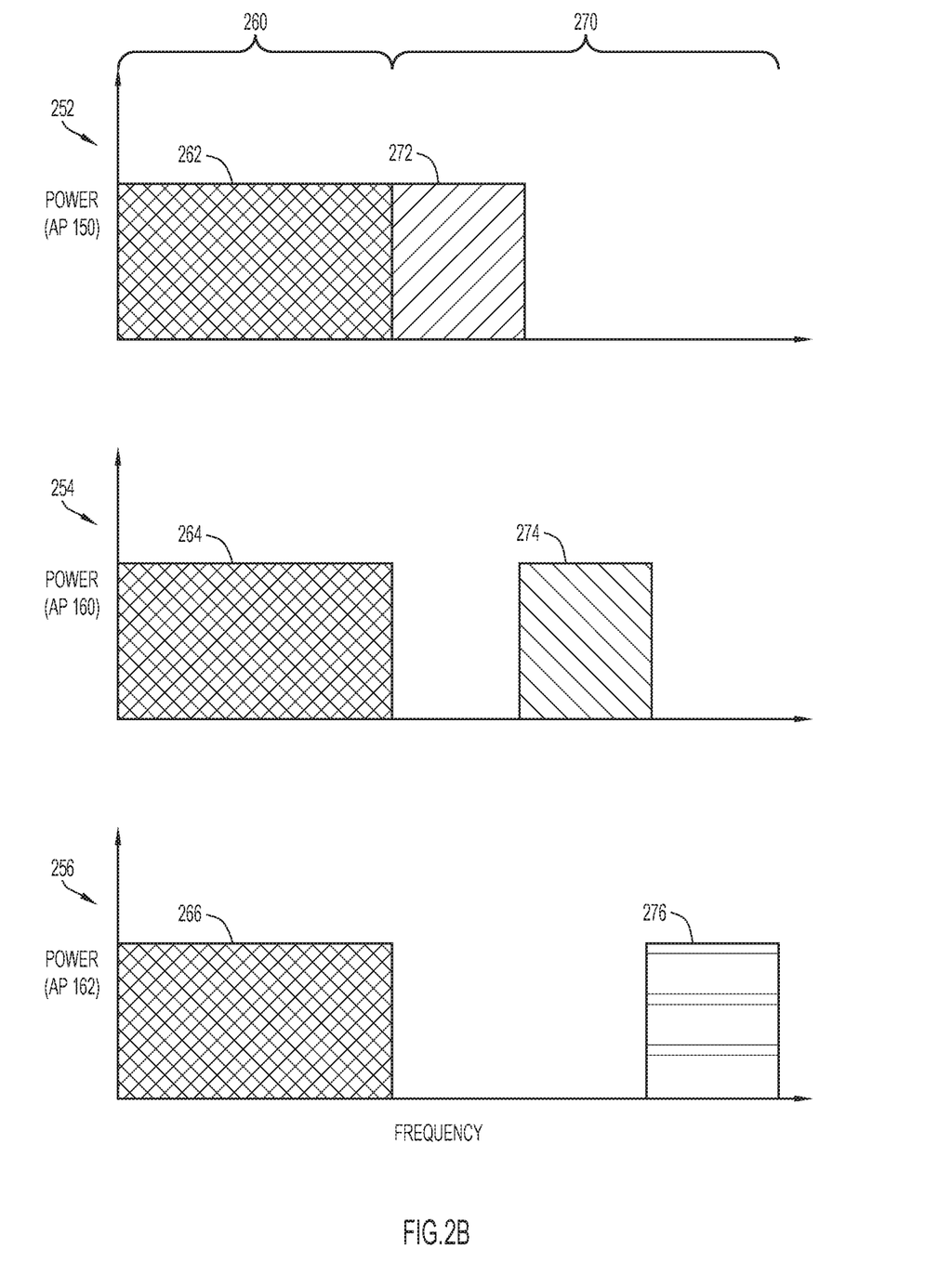
FIG. 2B illustrates the frequency bands assigned to each cell center and cell edge in a radio resource management system, according to an example embodiment.

Referring now to FIG. 2B, graphs of radio resources allocated to the access points 150, 160, and 162 as depicted in FIG. 2A, in implementing the frequency partition between the cells depicted in FIG. 2A an FFR plan are shown. Graph 252 illustrates the power allocated to access point 150 in order to serve cell 210. Similarly, graphs 254 and 256 illustrate the power allocated to access points 160 and 162 in order to serve cells 220 and 230, respectively.

The FFR plan sets a frequency partition that assigns a frequency band 260 to the cell center frequency bands 262, 264, and 266 for the access points 150, 160, and 162, respectively. In this example, the FFR plan designates that the cell center frequency use a FRF=1, and each of the access points 150, 160, and 162 use the entire frequency band 260 for the respective cell center frequency bands 262, 264, and 266. Since the devices in the cell center (e.g., UE 240) are significantly closer to the serving access point (e.g., AP 150) than the potentially interfering access points (e.g., AP 160 or a), the cell center devices are expected to receive decent service with a good SIR. The FFR plan also assigns a frequency band 270 to the cell edge frequency bands 272, 274, and 276 for the access pints 150, 160, and 162, respectively. In this example, the FFR plan designates that the cell edge frequency use a FRF=3, and each of the access points 150, 160, and 162 are assigned a non-overlapping third of the overall frequency band 270. Since each cell edge is physically proximate at least one other cell edge, the FFR plan ensures that neighboring cells are assigned different thirds of the overall frequency band 270 to minimize interference with other cell edges.

Figure 3:
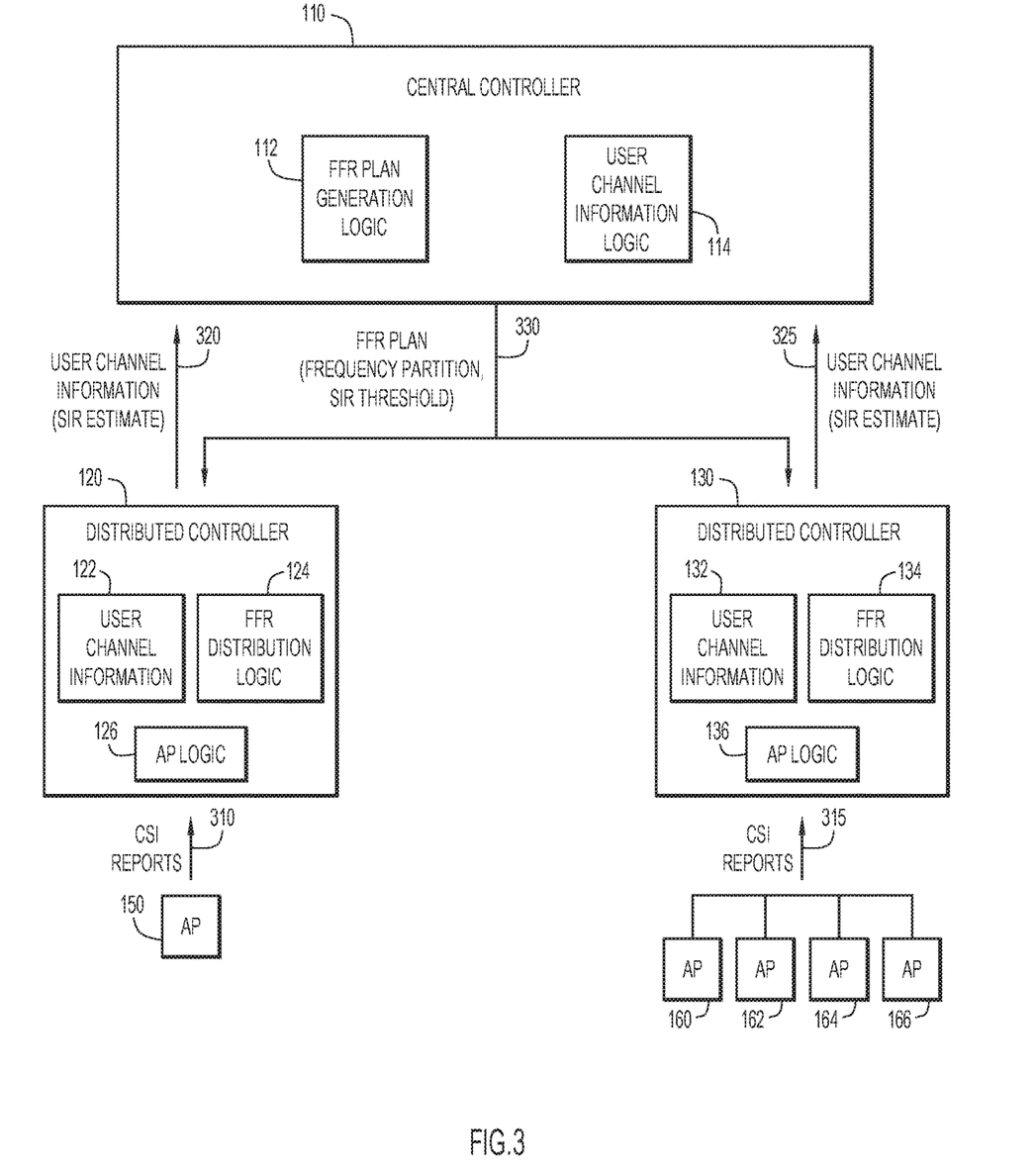
FIG. 3 is a simplified block diagram showing messages passed between a central radio resource controller and a plurality of distributed radio resource controllers, according to an example embodiment.

Referring now to FIG. 3, a simplified block diagram illustrates messages passed between the central controller 110 and the distributed controllers 120 and 130 to implement a dynamic, hybrid FFR system. Initially, the distributed controller 120 gathers information 310 from the access point 150 about the user devices connected to access point 150. In one example, the information 310 may include the number of user devices attached to the access point 150 and a measure of the quality of the wireless channel (e.g., channel state information report) for each of the user devices. Similarly, the distributed controller 130 gathers information 315 from the access points 160, 162, 164, and 166 about the user devices connected to each of the access points 160, 162, 164, and 166.

The distributed controller 120 may process the information 310 into user channel information 320 (e.g., an estimate of the SIR for each user device) and send the user channel information 320 to the central controller 110. Similarly, the distributed controller may process the information 315 into user channel information 325 and send the user channel information 325 to the central controller 110. The central controller 110 gathers the user channel information 320 and 325 from the distributed controllers with the user channel information logic 114 and uses FFR plan generation logic 112 to generate an FFR plan 330 for all of the access points and user devices under the control of the central controller 110.

In one example, the FFR plan 330 includes a frequency partition assigning frequency bands for cell centers and cell edges, as well as an SIR threshold for each access point to determine which user devices are in the cell center or in the cell edge. Once the FFR plan generation logic 112 generates an FFR plan 330, the central controller 110 provides the FFR plan 330 to the distributed controllers 120 and 130, which implement the FFR plan 330 at their respective access points.

Figure 4:
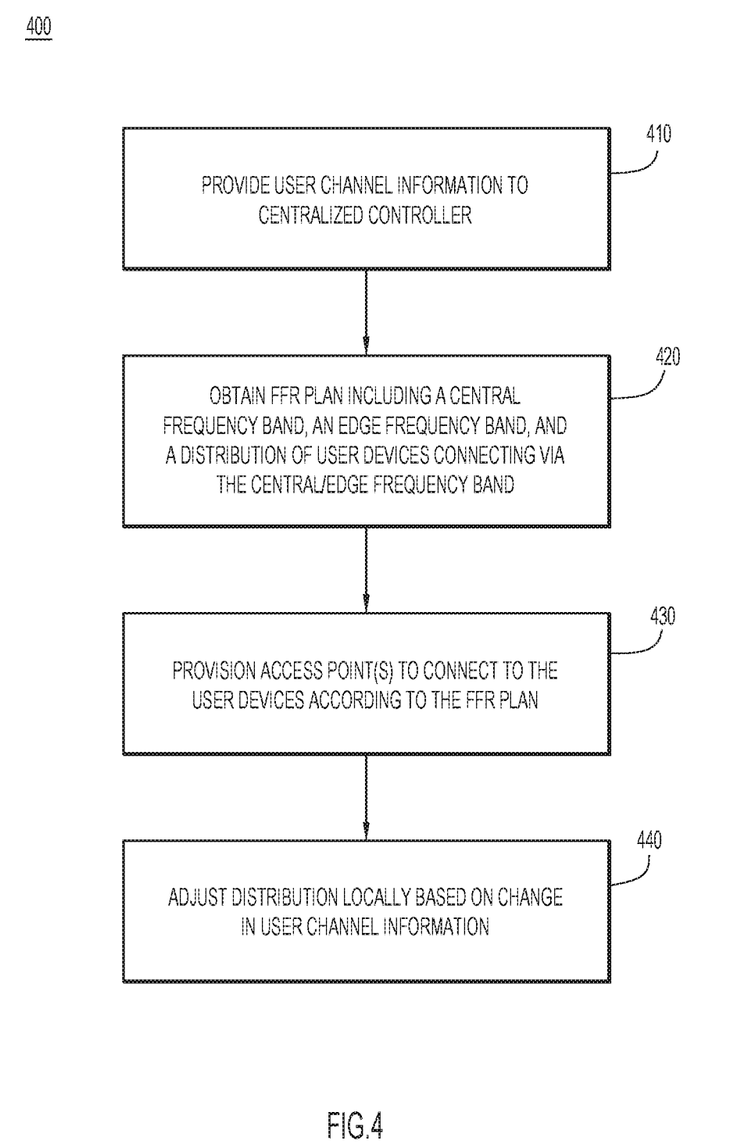
FIG. 4 is a flowchart illustrating operations of a distributed controller to implement a fractional frequency reuse system, according to an example embodiment.

Referring now to FIG. 4, a flowchart illustrates operations performed at a distributed controller (e.g., distributed controller 120) of local radio resources in a process 400 to implement a hybrid FFR system. At 410, the distributed controller provides user channel information to a central controller of regional radio resources. In one example, the user channel information may be an SIR estimate for each user device attached to access points controlled by the distributed controller. At 420, the distributed controller obtains an FFR plan from the central controller. The FFR plan designates, for an access point associated with the distributed controller, a central frequency band, an edge frequency band, and a distribution of a plurality of user devices connected to the access point. The distribution of user devices indicates whether each user device communicates with the access point via the central frequency band or via the edge frequency band. In one example, the distribution of user devices may be defined by an SIR threshold for determining whether each user device is assigned to the cell center or the cell edge.

At 430, the distributed controller provisions the access point to connect to the plurality of user devices according to the FFR plan. In one example, the distributed controller provisions the access point by assigning each user device to the central frequency band or the edge frequency band. At 440, the distributed controller locally adjusts the distribution of the user devices based on a change in the user channel information. In one example, a mobile user device originally in the cell center may move away from the serving access point toward the cell edge, which lowers the SIR of the channel between the mobile user device and the access point due to the increased distance to the serving access point and the reduced distance to the interfering access points. The distributed controller may adjust the distribution by directing the access point to connect to the mobile user device via the edge frequency band instead of the central frequency band, which increases the received SIR of the mobile user device and reduces the interference from neighboring cells.

In another example, the distributed controller may locally update the distribution of the user devices in a "two-band" approach. In the two-band approach the distributed controller may adjust the threshold for determining which user devices are assigned to the cell center or the cell edge any time a new user device joins or leaves the access point, or when the channel conditions dramatically change. To determine the threshold the distributed controller may sort the user devices in decreasing order according to $\mu_i = r_i^{cc}/r_i^{ce}$, where $r_i^{cc}$ is the expected data rate of a user device i is assigned to the cell center, and $r_i^{ce}$ is the expected data rate of the user device i is assigned to the cell edge. For i=1 ... N−1, where $N_j$ is the total number of user devices in the cell, the distributed controller simulates a distribution i in which user devices 1 ... i are assigned to the cell center and user devices i+1 ... $N_j$ are assigned to the cell edge. In other words, the distributed controller simulates distributions of assigning user devices to the cell center/edge by starting with the user device that has the highest ratio of data rate in the cell center to the cell edge, with each new simulated distribution adding the user device with the next highest data rate ratio to the cell center.

For each simulated distribution i, the distributed controller calculates a utility metric U(i) of the access point by adding the expected data rate of each user device (whether assigned to the cell center or the cell edge). Alternatively, the distributed may calculate the utility metric as a logarithmic function of the expected data rate for each user device, i.e., $U(i) = \Sigma_{N_j} \log(r_n)$. The distributed controller maximizes the utility metric U(i) to determine the threshold (e.g., the value of i) that provides the optimal distribution of user devices assigned to the cell center or the cell edge.

The two-band approach can be handled at each distributed controller with a complexity $O(N_j \log_2 N_j)$, which allows the distributed controller to update the distribution in real time. The central controller may periodically re-initialize the bands of the two-band approach by providing a new FFR plan with a new central frequency band, edge frequency band, and/or a new threshold for determining the cell center/edge partition.

In another example, an online dynamic user device approach enables the distributed controller to adjust the distribution of user devices when a new user device tries to access the network via the access point. The distributed controller adjust the distribution by directing the access point to connect to the new user device either via the central frequency band or the edge frequency band based on the remaining radio resources that are unassigned to existing user devices. For instance, an access point may have assigned radio resources from the central frequency band or the edge frequency band to existing user device when a new user device tries to join the network via the access point. Whenever a new user device tries to access the network, the distributed controller may calculate a utility metric of the new user device based on simulating the new user device using the central frequency band or the edge frequency band. For instance, the utility of the new user device may be related to the data rate that the new user device will expect in the cell center or the cell edge.

If the distributed controller determines that the new user device has a higher utility by joining the cell center and using the center frequency band, then the distributed controller will adjust the distribution of user devices to include the new user device in the cell center. Alternatively, if the distributed controller determines that the new user device has a higher utility by joining the cell edge and using the edge frequency band, then the distributed controller will adjust the distribution of user devices to include the new user device in the cell edge.

In a further example, the distributed controller may shift an existing user device from the cell center to the cell edge if the distributed controller determines that the existing user device is poorly served by the central frequency band. For instance, if the SIR of an existing user device drops below a predetermined minimum SIR, then that existing user device may be reassigned to use the edge frequency band to access the network via the access point.

Figure 5:
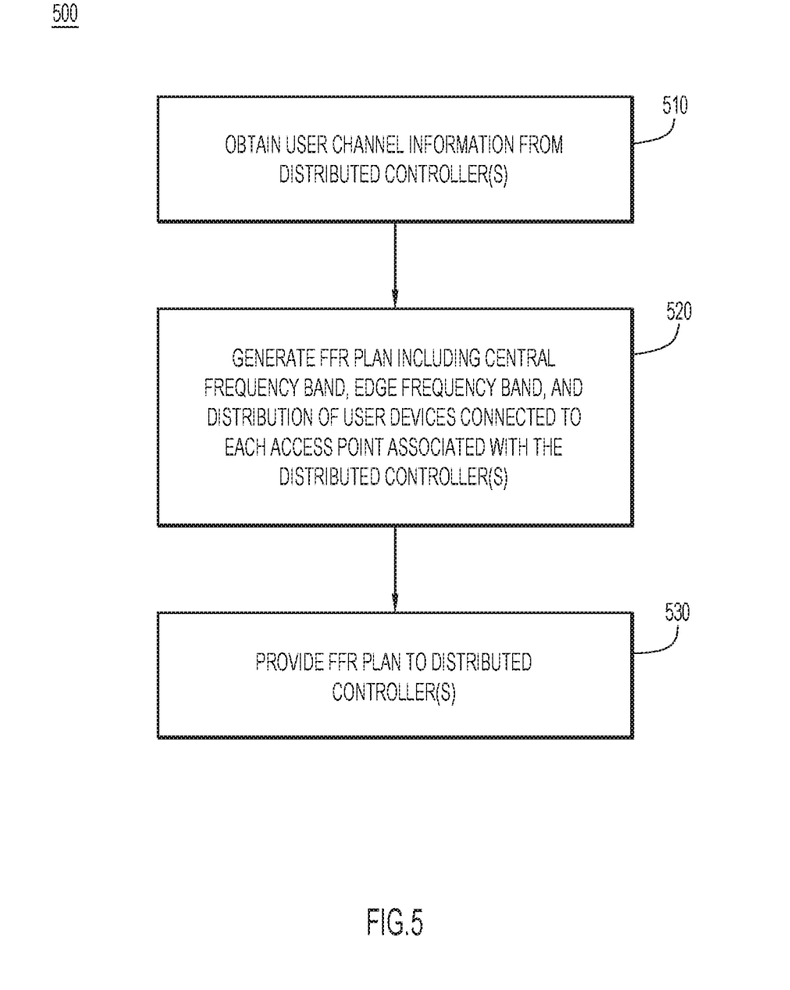
FIG. 5 is a flowchart illustrating operations of a central controller to implement a fractional frequency reuse system, according to an example embodiment.

Referring now to FIG. 5, a flowchart illustrates operations performed at a central controller of regional radio resources (e.g., central controller 110) in a process 500 to implement a hybrid FFR system. At 510, the central controller obtains user channel information from one or more distributed controllers. In one example, the user channel information may be an SIR estimate for each user device attached to access points controlled by the distributed controllers.

At 520, the central controller generates an FFR plan for the user devices connected to the access points associated with the distributed controllers. The FFR plan designates, for each access point associated with each distributed controller, a central frequency band, an edge frequency band, and a distribution of a plurality of user devices connected to the access point. The distribution of user devices indicates whether each user device communicates with the access point via the central frequency band or via the edge frequency band. In one example, the distribution of user devices may be defined by an SIR threshold for determining whether each user device is assigned to the cell center or the cell edge.

At 530, the central controller provides the FFR plan to the distributed controllers, enabling the distributed controllers to provision the access points according to the FFR plan. In one example, the central controller may provide only the portion of the overall FFR plan to each distributed controller. In other words, the central controller may provide frequency partition and user distribution only for the cells controlled by each respective distributed controller. The process 500 may iterate, with the central controller obtaining new user channel information from the distributed controllers, generating an updated FFR plan, and providing the updated FFR plan to the distributed controllers.

A simulated example of the dynamic FFR system described herein shows that the different approaches to offloading computational complexity from the central controller to the distributed controllers improve the data capacity of each cell, especially for the user devices at the edges of the cell, which typically receive poorer service. The results described hereinafter are derived from a simulation of a cellular network with 19 base stations (i.e., access points/cells) positioned 50 feet from each other in a uniformly distributed hexagonal grid. The system bandwidth is 40 MHz at a carrier frequency of 5.18 GHz. The transmit power of each base station is 25 dBm. The distance-dependent path-loss model is an 802.11 channel model with n=2 if the distance is less than 1 m, and n=3 if the distance is greater than 1 m. The shadowing standard deviation is 5 dB, and the beamforming gain is 3 dB. The antenna gain is set at 6 dB if the distance between the user device and the base station is greater than or equal to 8.8 m, and reduces from 6 dB proportionally as the distance closes below 8.8 m. The traffic model is a full buffer model, and the scheduling algorithm is a round robin model. Each user device connects to the nearest cell/base station. Additionally, the floor height is set to 4 m.

Each simulation is run under six different frequency reuse systems (FRF=1, FRF=3, fixed FFR, near-optimal FFR, two-band FFR, and online FFR) for comparison. In the FRF=1 system, each cell uses the same frequency band throughout the entire cell. In the FRF=3 system, adjacent cells use a different frequency band throughout the entire cell. In the fixed FFR system, each cell includes a cell center with the same frequency band as the adjacent cells and a cell edge with one of three edge frequency bands that differ for adjacent cells, but the frequency partition for the cell center and the cell edge is static with regard to the user devices in the cell. In the near-optimal FFR system, the fixed FFR system is updated to adjust the frequency band partition and threshold for assigning users to the cell center/edge by a central controller in a real-time manner. The two-band FFR system modifies the near-optimal FFR system by reducing the computational complexity and offloading the determining the cell center/edge threshold to each individual cell, as described herein. The online FFR system modifies the two-band FFR system by considering the real network scenario in which the access points have already accepted some user devices as cell center or cell edge devices, which have occupied some radio resources. In the online FFR system, the cell center or cell edge status decision for the incoming user devices is made based on the remaining radio resources in the network, without changing the cell center or cell edge status of the existing user devices.

For a random distribution of users, each run of the simulation includes a random number of user devices between 3 and 32, inclusive, per cell. In each cell, the user devices are randomly scattered throughout the coverage of the cell. The results for the simulations of random user distributions are described in Table I:

TABLE I

Random User Distribution

|  | Cell Center Capacity (Mbps) | Cell Edge Capacity (Mbps) | Overall Cell Capacity (Mbps) | 98% User Data Rate (Mbps) |
| --- | --- | --- | --- | --- |
| FR = 1 | 19.78 | 5.09 | 24.86 | 0 |
| FR = 3 | 12.62 | 8.53 | 21.15 | 0.1 |
| Fixed FFR | 23.09 | 7.54 | 30.64 | 0.087 |
| Near-Optimal FFR | 19.27 | 8.61 | 27.88 | 0.1 |
| Two-band FFR | 19.12 | 8.72 | 27.84 | 0.101 |
| Online FFR | 18.54 | 8.36 | 26.9 | 0.101 |

An improved FFR design may have the following merits:
1. In comparison to the FR=1 system, the FFR system has comparable cell center device performance, and an effective improvement in cell edge device performance.
2. In comparison to the FR=3, the FFR system has comparable cell edge device performance, and effective improvement in cell center device performance.
3. The FFR system improves performance across different dynamic network scenarios.
4. The FFR system has acceptable computational complexity.

As can be seen in Table 1, the FFR systems described herein (i.e., near-optimal, two-band, and online FFR systems) provide superior capacity to the legacy frequency reuse systems (i.e., FR=1, FR=3) which meet the first two criteria. Additionally, there is a minimal penalty with the less computationally intense FFR systems (i.e., two-band and online device FFR systems) in comparison to the near-optimal FFR system, which may require an unrealistic amount of processing power at the central controller.

In another set of simulations, a distribution of user devices is concentrated in the cell edge. Each run of the simulation includes a random number of user devices between 10 and 32, inclusive, per cell. In each cell, there is a 70% probability that the distance between a particular user device and the access point is larger than 0.42*cell radius. The results for the simulations of cell edge hot spot user distributions are described in Table II:

TABLE II

Cell Edge Hot Spot User Distribution

|  | Cell Center Capacity (Mbps) | Cell Edge Capacity (Mbps) | Overall Cell Capacity (Mbps) | 98% User Data Rate (Mbps) |
| --- | --- | --- | --- | --- |
| FR = 1 | 12.51 | 6.13 | 18.63 | 0 |
| FR = 3 | 8.34 | 9.85 | 18.19 | 0.085 |
| Fixed FFR | 21.51 | 7.59 | 29.1 | 0.066 |
| Near-Optimal FFR | 12.3 | 9.95 | 22.25 | 0.086 |
| Two-band FFR | 12.04 | 10.13 | 22.16 | 0.086 |
| Online Device FFR | 11.47 | 9.75 | 21.22 | 0.086 |

As can be seen in Table II, the FFR systems described herein (i.e., the near-optimal, two-band, and online FFR systems) improve the cell edge capacity in comparison with the FR=1 system and improve the cell center capacity in comparison with the FR=3 system for user distributions that have significantly more user devices in the cell edges. However, the fixed FFR system does not improve the performance in such an unbalanced scenario, as it does not adjust the cell edge and cell center frequency partition according to traffic dynamics. This results in the majority of user devices being designated as cell edge devices, which suffer low throughput. Notably, the FFR systems described herein (i.e., two-band, and online FFR systems) significantly improve the overall capacity of the cells in comparison to the legacy frequency reuse systems, without starving any user devices, as shown in the 98% user data rate.

In yet another set of simulations, a distribution of user devices is concentrated in the cell center. Each run of the simulation includes a random number of user devices between 10 and 32, inclusive, per cell. In each cell, there is a 70% probability that the distance between a particular user device and the access point is smaller than 0.42*cell radius. The results for the simulations of cell center hot spot user distributions are described in Table III:

TABLE III

Cell Center Hot Spot User Distribution

|  | Cell Center Capacity (Mbps) | Cell Edge Capacity (Mbps) | Overall Cell Capacity (Mbps) | 98% User Data Rate (Mbps) |
| --- | --- | --- | --- | --- |
| FR = 1 | 45.98 | 3.57 | 49.55 | 0 |
| FR = 3 | 26.21 | 5.14 | 31.35 | 0.112 |

TABLE III-continued

Cell Center Hot Spot User Distribution

|  | Cell Center Capacity (Mbps) | Cell Edge Capacity (Mbps) | Overall Cell Capacity (Mbps) | 98% User Data Rate (Mbps) |
| --- | --- | --- | --- | --- |
| Fixed FFR | 30.83 | 7.96 | 38.79 | 0.169 |
| Near-Optimal FFR | 45.7 | 5.22 | 50.92 | 0.11 |
| Two-band FFR | 45.81 | 5.27 | 51.07 | 0.11 |
| Online Device FFR | 45.55 | 4.9 | 50.46 | 0.103 |

As can be seen in Table III, the FFR systems described herein (i.e., the near-optimal, two-band, and online FFR systems) improve the cell edge capacity in comparison with the FR=1 system and improve the cell center capacity in comparison with the FR=3 system for user distributions that have significantly more user devices in the cell centers. However, the fixed FFR does not improve the performance in such an unbalanced scenario, as it does not adjust the cell edge and cell center frequency partition according to traffic dynamics.

Based on the above observations, the two-band FFR provides near-optimal results in different user device distribution scenarios with acceptable computational complexity. The online FFR system has slightly inferior, yet comparable, performance in comparison to the two-band FFR system, while facilitating other radio functionality (e.g., uplink power control), as it will not change the user device cell status or cell edge status frequently.

Figure 6:
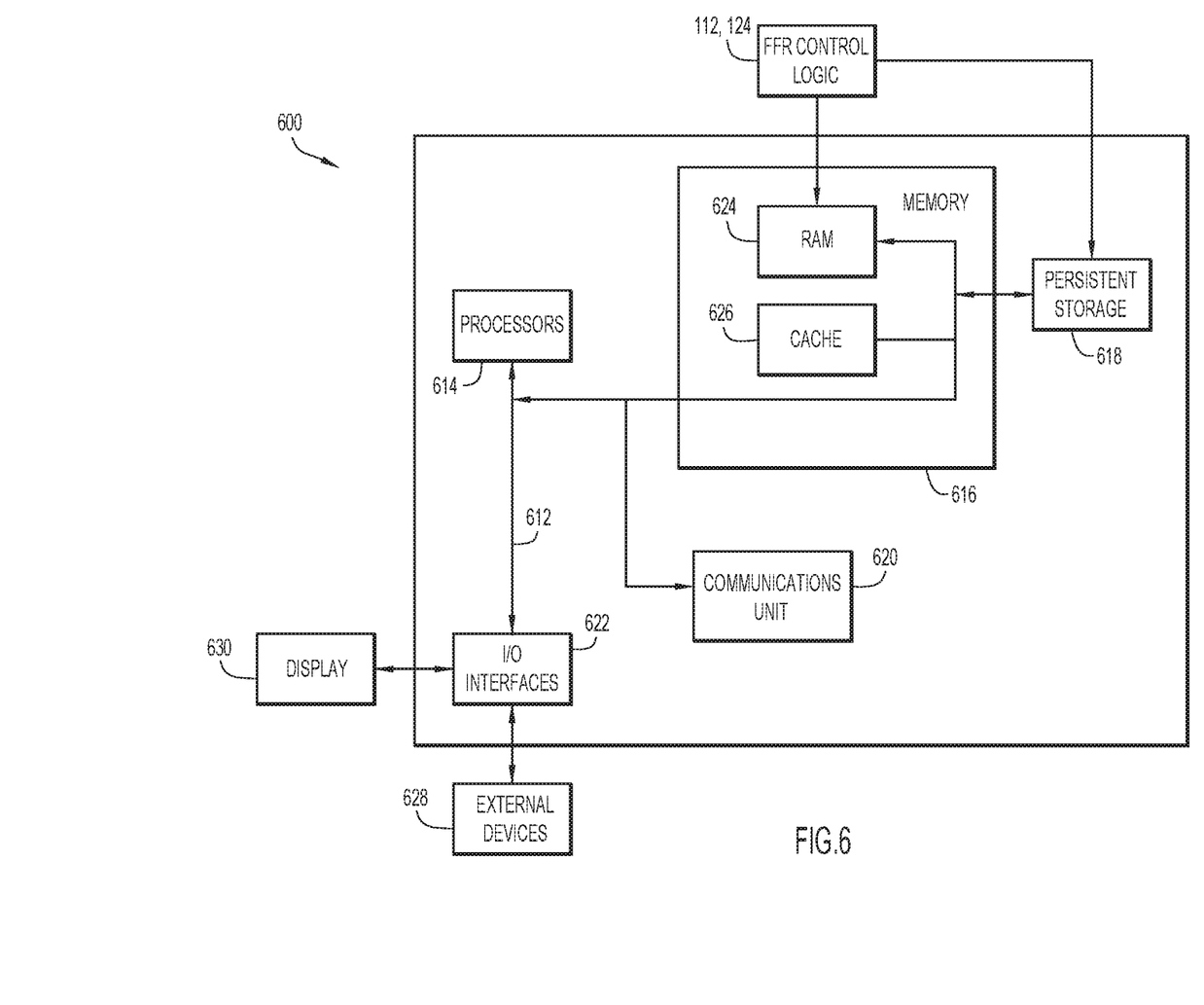
FIG. 6 illustrates a simplified block diagram of a device that may be configured to perform methods presented herein, according to an example embodiment.

Referring now to FIG. 6, a hardware block diagram illustrates a computing device 600 that may perform the functions of any of the servers or computing or control entities referred to herein in connection with the dynamic hybrid FFR system described herein. It should be appreciated that FIG. 6 provides only an illustration of one embodiment and does not imply any limitations with regard to the environments in which different embodiments may be implemented. Many modifications to the depicted environment may be made.

As depicted, the device 600 includes a bus 612, which provides communications between computer processor(s) 614, memory 616, persistent storage 618, communications unit 620, and input/output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media. In the depicted embodiment, memory 616 includes random access memory (RAM) 624 and cache memory 626. In general, memory 616 can include any suitable volatile or non-volatile computer readable storage media. Instructions for the FFR Control Logic 112 and/or 124 may be stored in memory 616 or memory 616 for execution by processor(s) 614.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes one or more network interface cards. Communications unit 620 may provide communications through the use of either or both physical and wireless communications links.

I/O interface(s) 622 allows for input and output of data with other devices that may be connected to computer device 600. For example, I/O interface 622 may provide a connection to external devices 628 such as a keyboard, a keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In summary, the techniques presented herein provide low complexity solution that enable FFR implementation in real networks with near optimal results. Additionally, with the introduction of OFDMA into IEE 802.11ax networks, the hybrid FFR mechanism described herein may further boost wireless network performance.

The two-band partition described herein provides an optimal solution for determining the cell center/edge partition in an FFR system. Simulation results show the two-band user device partition FFR is able to achieve near-optimal network performance with acceptable computational complexity in different network scenarios. In addition, the online user device dynamic cell center/edge partition provides another practical solution that considers real network constraints, and achieves comparable network performance to the optimal two-band partition with even lower computational complexity.

In one form, a method is provided for a distributed controller of local radio resources to implement a hybrid FFR system. The method comprises providing user channel information to a central controller of regional radio resources. The method also includes obtaining an FFR plan from the central controller. The FFR plan designates for an access point associated with the distributed controller, a central frequency band, an edge frequency band, and a distribution of a plurality of user devices connected to the access point. The distribution indicates whether each user device communicates with the access point via the central frequency band or via the edge frequency band. The method further comprises provisioning the access pint to connect to the plurality of user devices according to the FFR plan, and adjusting the distribution of user devices locally based on a change in the user channel information.

In another form, an apparatus comprising a network interface and a processor is provided. The network interface is configured to communicate with computing devices across one or more computer networks. The processor is configured to cause the network interface to provide user channel information to a central controller of radio resources. The process is also configured to obtain an FFR plan from the central controller. The FFR plan designates for an access point associated with the distributed controller, a central frequency band, an edge frequency band, and a distribution of a plurality of user devices connected to the access point. The distribution indicates whether each user device communicates with the access point via the central frequency band or via the edge frequency band. The process is further configured to provision the access pint to connect to the plurality of user devices according to the FFR plan, and adjust the distribution of user devices locally based on a change in the user channel information.

In still another form, a system comprising a central controller of regional radio resources and at least one distributed controller of local radio resources is provided. The central controller is configured to obtain user channel information for a plurality of user devices connected to at least one access point, and generate an FFR plan. The FFR plan designates a central frequency band, an edge frequency band, and a distribution of the plurality of user devices connected to the access point. The distribution indicates whether each user device communicates with the access point via the central frequency band or via the edge frequency band. The distributed controller(s) are configured to obtain the FFR plan from the central controller and provision the access point to connect to the plurality of user devices according to the FFR plan. The distributed controller(s) are also configured to locally adjust the distribution based on a change in the user channel information.

In yet another form, a non-transitory computer readable storage media is provided that is encoded with instructions that, when executed by a processor, cause the processor to perform any of the methods described and shown herein.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the presented embodiments.

Aspects of the present embodiments are described herein with reference to flowchart illustrations and/or block diagrams of methods, apparatus (systems), and computer program products according to presented embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various presented embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. In particular, the techniques described herein have been described with respect to particular protocols (e.g., TCP) and types of requests (e.g., API requests), but may be applied to any packet-based computer communication for any type of request from a host. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   at a distributed controller of local radio resources, providing user channel information to a central controller of regional radio resources;
   obtaining a Fractional Frequency Reuse (FFR) plan from the central controller, the FFR plan designating for an access point associated with the distributed controller, a central frequency band, an edge frequency band, and a distribution of a plurality of user devices connected to the access point, the distribution assigning each user device to communicate with the access point either via the central frequency band or via the edge frequency band based on a threshold in the user channel information;
   provisioning the access point to connect to the plurality of user devices according to the FFR plan;
   detecting a change in the user channel information;
   generating at the distributed controller, a plurality of simulated distributions of the plurality of user devices connected to the access point, wherein each simulated distribution of the plurality of simulated distributions is based on a corresponding threshold for assigning each user device to communicate with the access point either via the central frequency band or via the edge frequency band;
   selecting a particular simulated distribution that maximizes a utility metric of the access point; and adjusting the distribution locally by changing the threshold for assigning each user device to communicate with the access point either via the central frequency band or via the edge frequency band to a particular threshold corresponding to the particular simulated distribution.

2. The method of claim 1, wherein the utility metric is based on a summation of data rates for the plurality of user devices according to the plurality of simulated distributions.

3. The method of claim 2, wherein the summation is over a logarithmic function of the data rates.

4. The method of claim 1, wherein adjusting the distribution comprises adding a new user device to the distribution based on a comparison of the new user device communicating with the access point via the central frequency band or via the edge frequency band.

5. The method of claim 1, wherein adjusting the distribution comprises shifting one of the plurality of user devices from communicating with the access point via the central frequency band to communicating with the access point via the edge frequency band.

6. The method of claim 1, further comprising:
periodically obtaining an updated FFR plan from the central controller; and
provisioning the access point according to the updated FFR plan.

7. The method of claim 1, further comprising provisioning a plurality of access points according to the FFR plan, the FFR plan designating, for each particular access point of the plurality of access points, the central frequency band, a particular edge frequency band, and a particular distribution of a particular plurality of user devices connected to the particular access point, wherein the particular distribution indicates whether each user device in the particular plurality of user devices communicates with the particular access point via the central frequency band or via the particular edge frequency band.

8. An apparatus comprising:
a network interface configured to communicate with computing devices across one or more computer networks; and
a processor configured to:
cause the network interface to provide user channel information to a central controller of regional radio resources;
obtain a Fractional Frequency Reuse (FFR) plan from the central controller, the FFR plan designating for an access point associated with the apparatus, a central frequency band, an edge frequency band, and a distribution of a plurality of user devices connected to the access point, the distribution assigning each user device to communicate with the access point either via the central frequency band or via the edge frequency band based on a threshold in the user channel information;
provision the access point to connect to the plurality of user devices according to the FFR plan;
detect a change in the user channel information;
generate a plurality of simulated distributions of the plurality of user devices connected to the access point, wherein each simulated distribution of the plurality of simulated distributions is based on a corresponding threshold for assigning each user device to communicate with the access point either via the central frequency band or via the edge frequency band;
select a particular simulated distribution that maximizes a utility metric of the access point; and
adjust the distribution locally by changing the threshold for assigning each user device to communicate with the access point either via the central frequency band or via the edge frequency band to a particular threshold corresponding to the particular simulated distribution.

9. The apparatus of claim 8, wherein the utility metric is based on a summation of data rates for the plurality of user devices according to the plurality of simulated distributions.

10. The apparatus of claim 9, wherein the processor is configured to calculate the summation over a logarithmic function of the data rates.

11. The apparatus of claim 8, wherein the processor is configured to adjust the distribution by adding a new user device to the distribution based on a comparison of the new user device communicating with the access point via the central frequency band or via the edge frequency band.

12. The apparatus of claim 8, wherein the processor is configured to adjust the distribution by shifting one of the plurality of user devices from communicating with the access point via the central frequency band to communicating with the access point via the edge frequency band.

13. The apparatus of claim 8, wherein the processor is further configured to:
periodically obtain an updated FFR plan from the central controller; and
provision the access point according to the updated FFR plan.

14. The apparatus of claim 8, wherein the processor is further configured to provision a plurality of access points according to the FFR plan, the FFR plan designating, for each particular access point of the plurality of access points, the central frequency band, a particular edge frequency band, and a particular distribution of a particular plurality of user devices connected to the particular access point, wherein the particular distribution indicates whether each user device in the particular plurality of user devices communicates with the particular access point via the central frequency band or via the particular edge frequency band.

15. A system comprising:
a central controller of regional radio resources configured to:
obtain user channel information for a plurality of user devices connected to at least one access point; and
generate a Fractional Frequency Reuse (FFR) plan designating a central frequency band, an edge frequency band, and a distribution of the plurality of user devices connected to the access point, the distribution assigning each user device to communicate with the access point either via the central frequency band or via the edge frequency band based on a threshold in the user channel information; and
at least one distributed controller configured to:
obtain the FFR plan from the central controller;
provision the access point to connect to the plurality of user devices according to the FFR plan;
detect a change in the user channel information;
generate a plurality of simulated distributions of the plurality of user devices connected to the access point, wherein each simulated distribution of the plurality of simulated distributions is based on a corresponding threshold for assigning each user device to communicate with the access point either via the central frequency band or via the edge frequency band;
select a particular simulated distribution that maximizes a utility metric of the access point; and adjust the distribution locally by changing the threshold for assigning each user device to communicate with the access point either via the central frequency band or via the edge frequency band to a particular threshold corresponding to the particular simulated distribution.

16. The system of claim 15, wherein the utility metric is based on a summation of data rates for the plurality of user devices according to the plurality of simulated distributions.

17. The system of claim 16, wherein the distributed controller is configured to calculate the summation over a logarithmic function of the data rates.

18. The system of claim 15, wherein the distributed controller is configured to adjust the distribution by adding a new user device to the distribution based on a comparison of the new user device communicating with the access point via the central frequency band or via the edge frequency band.

19. The system of claim 15, wherein the distributed controller is configured to adjust the distribution by shifting one of the plurality of user devices from communicating with the access point via the central frequency band to communicating with the access point via the edge frequency band.

20. The system of claim 15, wherein the central controller is further configured to periodically generate an updated FFR plan and provide the updated FFR plan to the distributed controller, and wherein the distributed controller is further configured to provision the access point according to the updated FFR plan.

* * * * *